(12) United States Patent
Yang et al.

(10) Patent No.: US 7,847,533 B2
(45) Date of Patent: Dec. 7, 2010

(54) APPARATUS PROVIDING PROTECTION FOR POWER CONVERTER

(75) Inventors: Ta-Yung Yang, Milpitas, CA (US);
Chien-Yuan Lin, Taipei County (TW);
Tso-Min Chen, Taichung (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 12/550,397

(22) Filed: Aug. 30, 2009

(65) Prior Publication Data

US 2009/0316451 A1 Dec. 24, 2009

Related U.S. Application Data

(62) Division of application No. 11/461,405, filed on Jul. 31, 2006, now Pat. No. 7,602,160.

(51) Int. Cl.
*G05F 1/40* (2006.01)

(52) U.S. Cl. ...................................... 323/284

(58) Field of Classification Search ................. 323/265, 323/268, 271, 282–285
See application file for complete search history.

(56) References Cited

U.S. PATENT DOCUMENTS

| 4,736,267 | A  | * | 4/1988  | Karlmann et al. | ............ | 361/101 |
| 7,298,117 | B2 | * | 11/2007 | Hasegawa et al. | ............ | 323/222 |
| 7,378,826 | B2 | * | 5/2008  | Liao            | ............ | 323/283 |

* cited by examiner

*Primary Examiner*—Matthew V Nguyen
(74) *Attorney, Agent, or Firm*—Jianq Chyun IP Office

(57) ABSTRACT

A switching circuit for a power converter includes an oscillation circuit, a first circuit, and a first comparator. The oscillation circuit generates a switching signal for regulating an output of the power converter. The first circuit generates a threshold signal. The first comparator is coupled to receive a signal representative of a current through a power switch. Besides, the first comparator generates a control signal in response to the signal and the threshold signal. A frequency of the switching signal is increased in response to the enabling of the control signal.

5 Claims, 5 Drawing Sheets

APPARATUS PROVIDING PROTECTION FOR POWER CONVERTER

CROSS-REFERENCE TO RELATED APPLICATION

This application is a divisional of and claims the priority benefit of U.S. application Ser. No. 11/461,405, filed on Jul. 31, 2006, now allowed. The entirety of the above-mentioned patent application is hereby incorporated by reference herein and made a part of this specification.

BACKGROUND OF THE INVENTION

1. Field of the Invention

The invention generally relates to a power converter and more specifically relates to a switching control circuit of a power converter.

2. Description of Related Art

Various power converters have been widely used to provide regulated voltage and current. For the sake of safety reasons, an over-power protection must be provided to protect both power converter itself and the system powers. A limited output power is thus required for the control of a power converter. However, many applications such as motor drivers, laser equipment require a surge output power that is not fit for traditional over-power protection. The invention provides an integrated and strict protection for the power converter required the surge output power.

SUMMARY OF THE INVENTION

The invention provides a surge output power protection for a switching control circuit of a power converter. A switching control circuit can also be a control circuit or a switching circuit. It comprises an input circuit coupled to receive a threshold signal which can be a threshold voltage or a threshold current at an input terminal. A first comparator is coupled to receive a signal representative of the current of a power switch. The comparator further generates a control signal in response to the signal and the threshold signal. A second comparator is coupled to receive the signal to limit the current of the power switch. A timer circuit is coupled to generate a timing signal at a timer terminal in response to the control signal. The timer circuit generates a time-out signal in response to the timing signal. The time-out signal is coupled to turn off the power switch.

It is to be understood that both the foregoing general descriptions and the following detailed descriptions are exemplary, and are intended to provide further explanation of the invention as claimed.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF EMBODIMENTS

Figure 1:
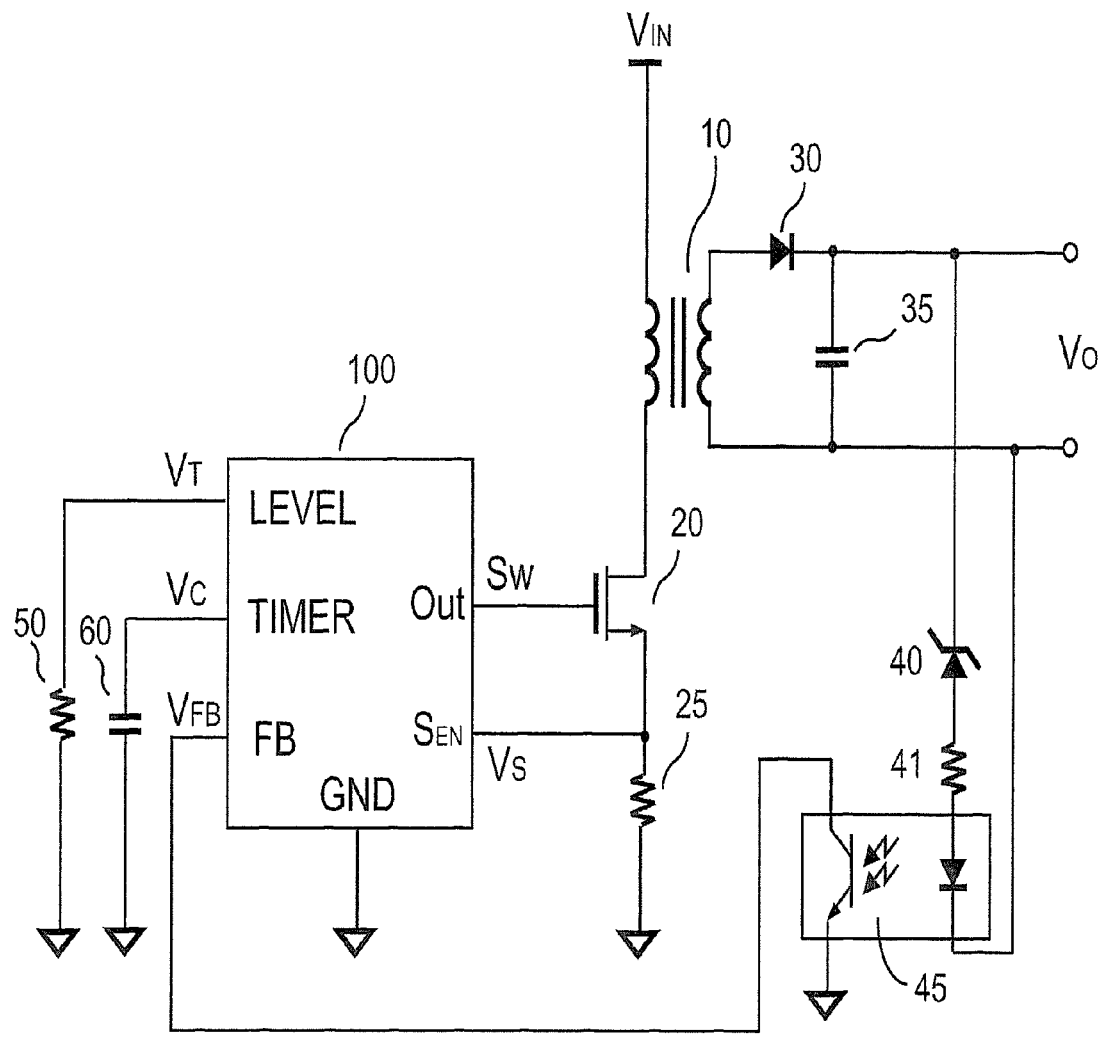
FIG. 1 shows a schematic diagram of a power converter according to an embodiment of the invention.

FIG. 1 shows a power converter. The power converter includes a switching control circuit 100 coupled to the output $V_O$ of the power converter to produce a switching signal SW for regulating the output $V_O$ of the power converter. The switching signal SW is connected to a power switch 20 to switch a transformer 10 and control the energy transferred through the transformer 10. As the switching signal SW is enabled, a switching current $I_P$ of the power switch 20 will be generated accordingly. The switching current $I_P$ can be expressed as, $$I_P = \frac{V_{IN}}{L_P} \times T_{ON} \tag{1}$$

where $V_{IN}$ is an input voltage applied to the transformer 10; $L_P$ is the primary inductance of the transformer 10 and $T_{ON}$ is an on time of the switching signal SW. The switching current $I_P$ produces a signal VS through a resistor 25. The signal VS is coupled to a sense terminal SEN of the switching control circuit 100. The output $V_O$ is generated from the transformer 10 via a rectifier 30 and a capacitor 35. A reference voltage device 40 and a resistor 41 are connected in serial. The reference voltage device 40 is connected to the output $V_O$. The resistor 41 is connected to an optical isolator 45. The optical isolator 45 therefore generates a feedback signal $V_{FB}$ coupled to the switching control circuit 100. A resistor 50 is connected to an input terminal LEVEL of the switching control circuit 100 to generate a threshold signal VT. A capacitor 60 is connected to a timer terminal TIMER of the switching control circuit 100 to produce a timing signal VC. Both the threshold signal VT and the timing signal are used for protecting the power converter.

Figure 2:
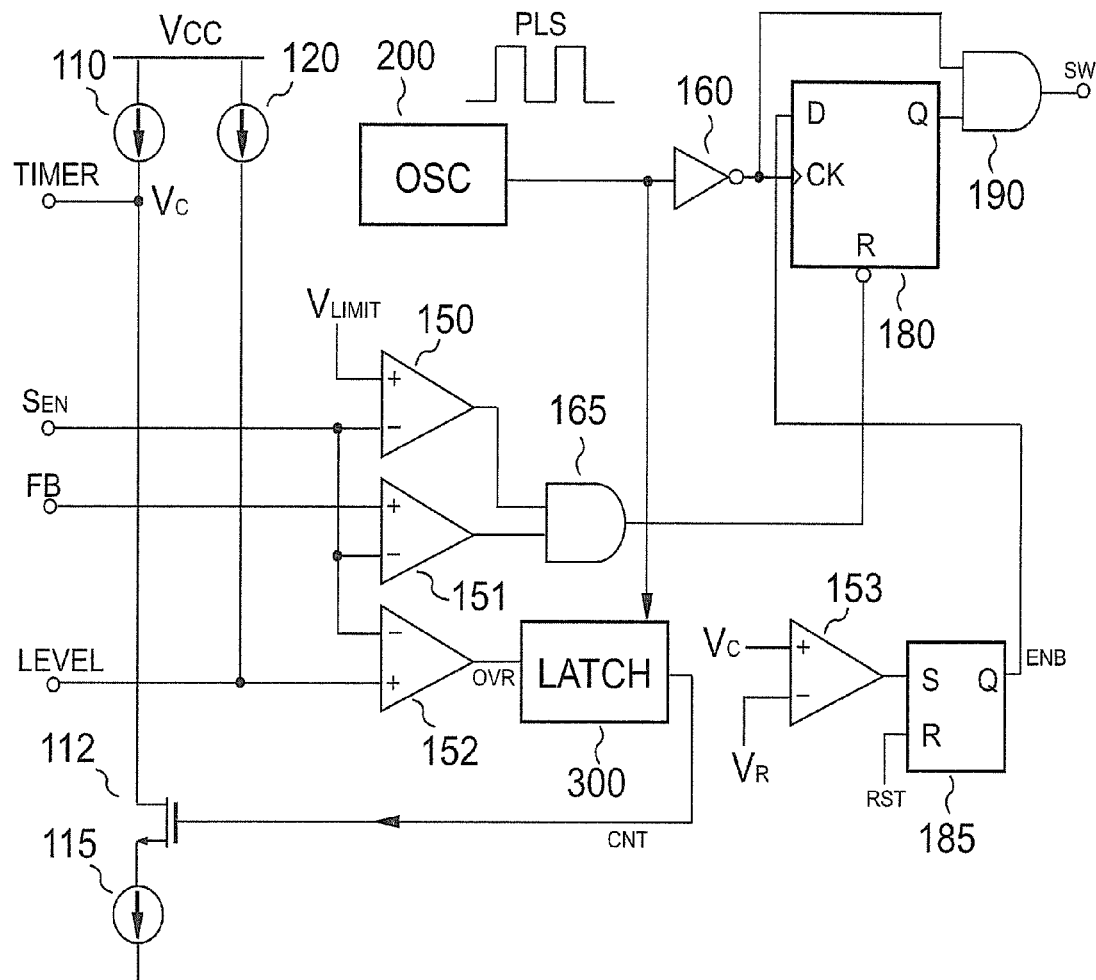
FIG. 2 shows an embodiment of a switching control circuit of the power converter.

FIG. 2 shows an embodiment of the switching control circuit 100. The switching control circuit 100 comprises an input circuit to receive the threshold signal VT at an input terminal LEVEL. The input circuit includes a constant current source 120 to produce a current that associates with the resistor 50 to generate the threshold signal VT. A comparator 152 is coupled to the resistor 50 to receive the signal VS representative of the current of the power switch 20. The comparator 152 is used to generate an over-threshold signal OVR when the level of the signal VS is higher than the level of the threshold signal VT. The over-threshold signal OVR further produces a control signal CNT through a latch circuit 300. Since the over-threshold signal OVR is generated in response to the enabling of the switching signal SW. The latch circuit 300 is utilized to hold the state of the over-threshold signal OVR. The control signal CNT indicates the switching current $I_P$ of the power switch 20 is over the threshold signal VT. A comparator 150 is coupled to receive the signal VS as well. The comparator 150 is utilized to limit the maximum current of the power switch 20. It is used to compare the signal VS representative of the current through the power switch 20 with a current-limit threshold signal $V_{LIMIT}$ such that the power switch 20 can be turned off cycle-by-cycle in response to the output of the comparator 150 when the current limit set by the current-limit threshold signal $V_{LIMIT}$ is exceeded. The level of the threshold signal VT is lower than the level of the current-limit threshold signal $V_{LIMIT}$. The comparator 152 generates the control signal CNT through the latch circuit 300 to show the surge power is outputted from the power converter. The comparator 150 is utilized to limit the maximum value of the surge power.

The switching control circuit 100 comprises a timer circuit to limit a surge output period. The surge output period indicates the surge power is outputted from the power converter. The timer circuit is coupled to the capacitor 60 to generate the timing signal VC at the timer terminal TIMER in response to the control signal CNT. A time-out signal ENB is produced when the timing signal VC is over a threshold signal VR. The time-out signal ENB is coupled to turn off the power switch 20 for the protection. The timer circuit includes current sources 110, 115, a transistor 112, a comparator 153 and a flip-flop 185. The transistor 112 is turned on to discharge the capacitor 60 through current source 115 when the control signal CNT is logic high. The current of the current source 115 is higher than the current of the current source 110. When the control signal is logic low, the current source 110 charges the capacitor 60 to generate the timing signal VC. The timing signal VC is coupled to compare with the threshold signal VR at the comparator 153. The output of the comparator 153 is connected to set the flip-flop 185 for generating the time-out signal ENB when the time signal VC is higher than the threshold signal VR. The flip-flop 185 is reset by a power-on-reset signal RST. The output of the flip-flop 185 generates the time-out signal ENB to latch off the power switch 20 when the surge output period is over a maximum period $T_{SURGE}$. The current $I_{110}$ of the current source 110, the capacitance $C_{60}$ of the capacitor 60 and the voltage of the threshold signal VR determine the maximum period $T_{SURGE}$, it can be expressed as, $$T_{SURGE} = \frac{C_{60}}{I_{110}} \times V_R \qquad (2)$$

The switching control circuit 100 is a pulse width modulation circuit that generates the switching signal SW to drive power switch 20 for regulating the output of the power converter. An oscillation circuit 200 generates a clock signal PLS coupled to the clock-input of a flip-flop 180. The D-input of the flip-flop 180 is connected by the time-out signal ENB. The reset-input of the flip-flop 180 is connected to the output of the AND gate 165. The input of the AND gate 165 is connected to the output of the comparator 150. Another input of the AND gate 165 is connected to the output of a comparator 151. The input of the comparator 151 is coupled to receive the feedback signal $V_{FB}$ and the signal VS. The output of the flip-flop 180 is connected to a AND gate 190. Another input of the AND gate 190 is connected to the clock signal PLS through an inverter 160. The output of the AND gate 190 generates the switching signal SW. The switching signal is therefore enabled by the clock signal PLS periodically if the time-out signal ENB is logic high. The switching signal SW is controlled by the feedback signal for regulating the output of the power converter. Besides, in order to protect the power switch 20, the switching signal SW can be disabled when the switching current $I_P$ is higher than the current-limit threshold signal $V_{LIMIT}$. Furthermore, the switching signal SW can be latched off to protect the power switch 20 when time-out signal ENB is enabled logic low.

Figure 3:
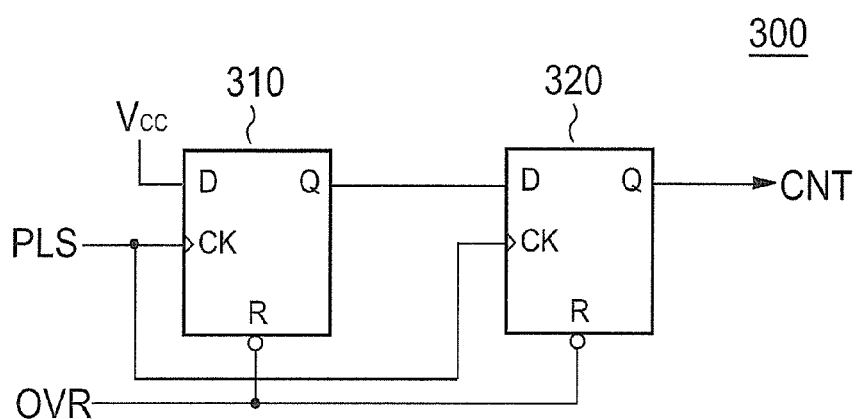
FIG. 3 shows a latch circuit according to an embodiment of the invention.

FIG. 3 shows the latch circuit 300, which comprises two flip-flops 310 and 320 to hold the state of the over-threshold signal OVR and generate the control signal CNT. The clock input of the flip-flop 310 and 320 are connected with the clock signal PLS. The D-input of the flip-flop 310 is enabled. The D-input of the flip-flop 320 is connected to the output of the flip-flop 310. The reset-input of the flip-flop 310 and 320 are connected to the output of the comparator 152 to receive the over-threshold signal OVR. The output of the flip-flop 320 generates the control signal CNT.

Figure 4:
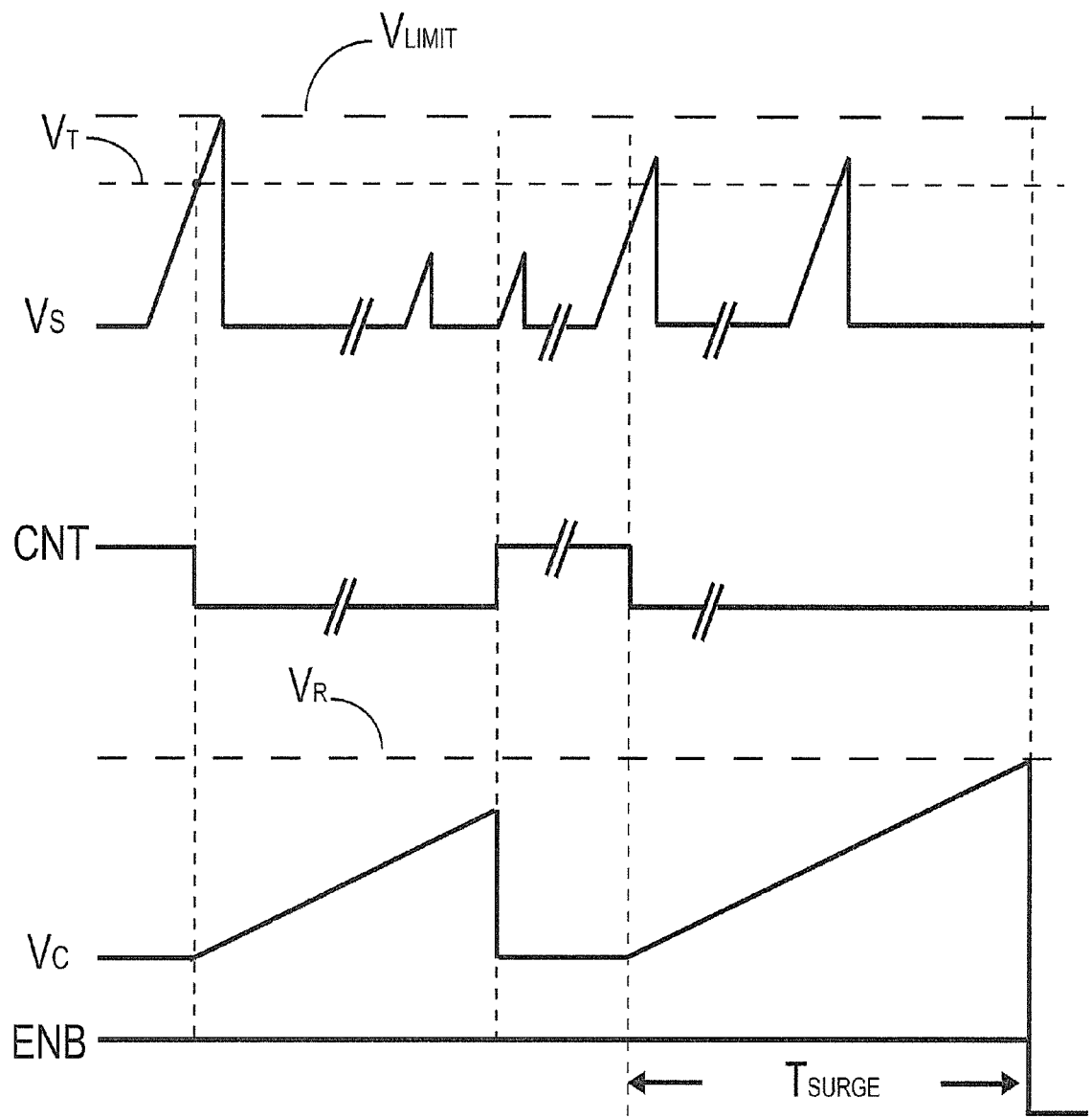
FIG. 4 shows signal waveforms of the switching control circuit.

FIG. 4 shows signal waveforms, in which the signal VS represents the switching current $I_S$ through the power switch 20. The signal VS is limited under the current-limit threshold signal $V_{LIMIT}$, which protect the power converter from permanent damage under short circuit and/or over-current conditions. During the surge output period, the control signal CNT enables the charge of the capacitor 60 to produce the timing signal VC. If the surge output period is longer than a maximum period $T_{SURGE}$, then the time-out signal ENB will be generated to latch off the switching signal SW and protect the power switch 20 from over-heat damage. Because of the protection of invention, lower rating devices such as the power switch 20 and the transformer 10 etc. can be used to save the material cost of the power converter.

Figure 5:
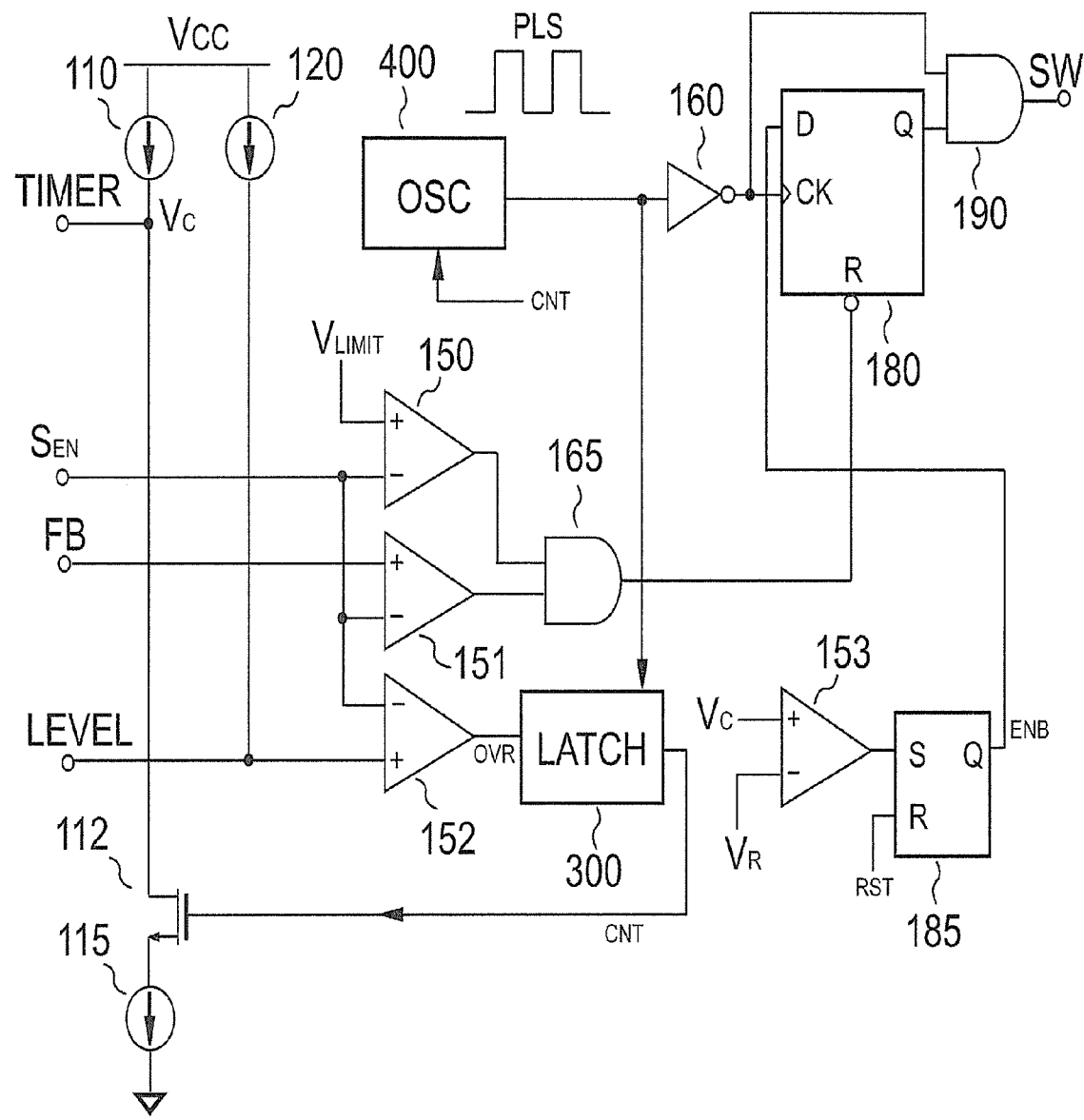
FIG. 5 shows another embodiment of the switching control circuit of the power converter of the invention.

FIG. 5 shows another embodiment of the switching control circuit 100, in which the control signal CNT is coupled to an oscillation circuit 400 to increase the switching frequency of the switching signal SW when the surge power is outputted. The output power $P_O$ of the power converter is given by the following equation, $$P_O = \frac{1}{2} \times L_P \times I_P^2 \times F_{SW} \times \eta \qquad (2)$$

where $F_{SW}$ is the switching frequency of the switching signal SW; $\eta$ is the efficiency of the power converter.

The equation shows the output power $P_O$ is correlated to the switching frequency $F_{SW}$. Increasing the switching frequency $F_{SW}$ will ensure a sufficient output power of power converter.

Figure 6:
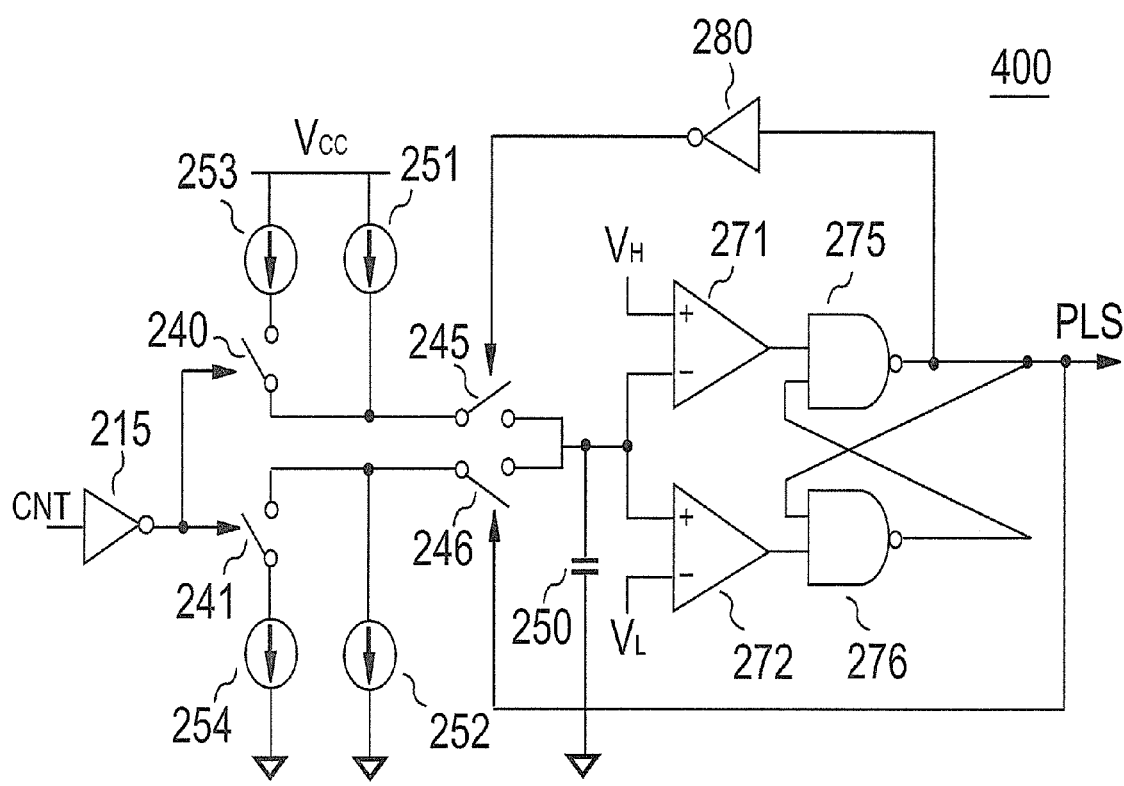
FIG. 6 shows an oscillation circuit.

FIG. 6 shows the oscillation circuit 400. The oscillation circuit 400 comprises current sources 251 and 252 and comparators 271 and 272. The current source 251 is connected to charge a capacitor 250 through a switch 245. The current source 252 is connected to the capacitor 250 to discharge the capacitor 250 via a switch 246. The comparator 271 with a high trip-point voltage VH is connected to the capacitor 250. The comparator 272 with a low trip-point voltage VL is connected to capacitor 250 as well.

The output of comparators 271 and 272 are connected to NAND gates 275 and 276 respectively. NAND gates 275 and 276 form a latch circuit to generate the clock signal PLS. The clock signal PLS is used to control the switch 246. The switch 245 is also controlled by the clock signal PLS through an inverter 280. A current source 253 is connected to the current source 251 via a switch 240. A current source 254 is connected to the current source 252 via a switch 241. Switches 240 and 241 are controlled by the control signal CNT through an inverter 215. The frequency of the clock signal PLS is thus increased in response to the enabling of the control signal CNT.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. A switching circuit for a power converter, comprising:
an oscillation circuit directly generating a switching signal for regulating an output of the power converter, the oscillator circuit further receives a control signal and a frequency of the switching signal is varied according to the control signal directly;
a first circuit generating a threshold signal; and
a first comparator coupled to receive a signal representative of a current through a power switch, the first comparator generating the control signal in response to the signal and the threshold signal, wherein the frequency of the switching signal is increased in response to enabling of the control signal.

2. The switching circuit as claimed in claim 1, further comprising a second comparator coupled to compare the signal representative of the current through the power switch with a current-limit threshold signal such that the power switch is turned off in response to an output of the second comparator when a current limit set by the current-limit threshold signal is exceeded.

3. The switching circuit as claimed in claim 2, wherein the threshold signal is lower than the current-limit threshold signal.

4. The switching circuit as claimed in claim 1, wherein the switching circuit is a pulse width modulation circuit that generates the switching signal coupled to be received by the power switch to regulate the output of the power converter.

5. The switching circuit as claimed in claim 2, wherein the switching circuit generates the switching signal controlled in response to an output of the first comparator and the output of the second comparator such that the switching signal is coupled to protect the power switch.

* * * * *